L. ROEBEL.
ELECTRICAL CONDUCTOR.
APPLICATION FILED MAR. 1, 1913.
1,144,252.
Patented June 22, 1915.
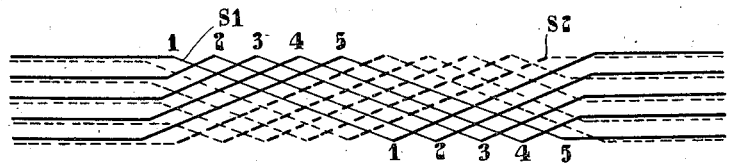
Fig. 1.
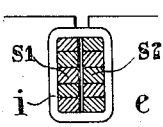   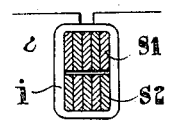
Fig. 1a.   Fig. 6.
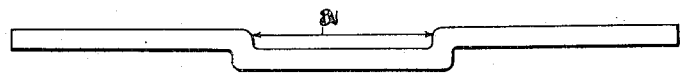
Fig. 2.
Fig. 3.
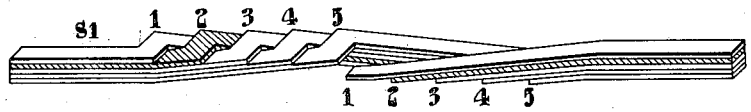
Fig. 4a.
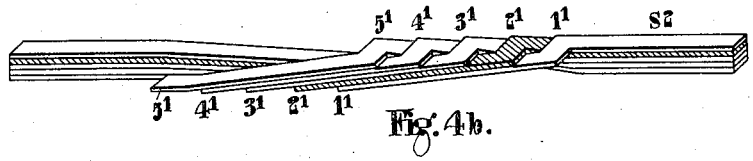
Fig. 4b.
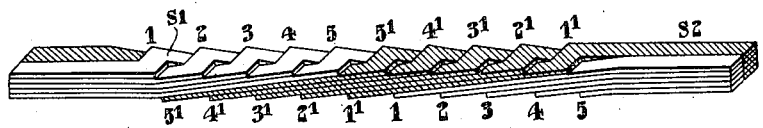
Fig. 5.
WITNESSES
H. L. Alden
R. E. Ourand
INVENTOR
Ludwig Roebel
BY
Spear, Middleton, Donaldson & Spear
ATTORNEY

UNITED STATES PATENT OFFICE.

LUDWIG ROEBEL, OF MANNHEIM-KÄFERTHAL, GERMANY, ASSIGNOR TO AKTIEN-GESELLSCHAFT BROWN BOVERI & CIE., OF BADEN, SWITZERLAND.

ELECTRICAL CONDUCTOR.

1,144,252.   Specification of Letters Patent.   Patented June 22, 1915.

Application filed March 1, 1913. Serial No. 751,640.

*To all whom it may concern:*

Be it known that I, LUDWIG ROEBEL, a subject of the Emperor of Germany, and residing at Mannheim - Käferthal, Germany, have invented certain new and useful Improvements in and Relating to Electrical Conductors, of which the following is a specification.

This invention relates to electrical conductors for dynamo electric machinery and the like.

It is a well known fact that eddy currents occur in conductors conveying alternating current within electrical machines, and that these eddy currents are due to differences of potential produced by the unequal distribution of the field within the slot between parts of one and the same conductor, these differences becoming equalized in the interior of the conductor. In machines for heavy currents with conductors of large copper cross section, the eddy currents produce, as is well known, considerable losses and non-permissible heating. It has been proposed to avoid the production of eddy currents by various expedients of which the one which is best known, is the subdivision of the conductor into a number of separate parallel component conductors more or less efficiently insulated from one another. These component conductors must not be soldered at the end of each slot, but must extend through all or at least a number of slots before they can be connected in parallel since otherwise internal currents would also be generated. The parallel connecting of many component conductors only at the ends of the whole winding is a drawback which can to some extent be avoided by stranding together the component conductors to form a cable within each slot. In stranding round conductors together to form a cable, however, the cross sectional area of the slot is not efficiently utilized, and therefore the slots must be made larger than is otherwise necessary. This is also the case when strands composed of round wires braided together are used. In both cases, for practical reasons it is necessary to use a great number of thin component conductors, whereby the copper cost is increased considerably. If it is desired to use component conductors of larger cross section, a mere stranding together of the component parts would be unsuitable.

The present invention has for its object to provide an arrangement which allows not only of using component conductors of any desired thickness, but it also allows of using the cross sectional form which is most suitable for utilizing the capacity of the slot, namely, the rectangular form.

The invention includes the provision of a composite conductor in which each component conductor is led within the slot through each point of the cross section thereof and issues from the slot at a corresponding point of the cross section to that at which it entered the slot.

The invention broadly consists in intertwining a group of component conductors in such a manner that there is no considerable twisting of each single component conductor, and further by stranding together the groups of intertwined component conductors.

The invention also consists in a composite conductor in which each component conductor is doubly cranked at least twice by a machine or otherwise, the crankings being made preferably at the same distances from one another in all the component conductors.

Referring to the accompanying diagrammatic drawings, Figure 1 shows a scheme according to which the conductors can be laid in one form of the present invention; Fig. 1ª shows a cross section of slot with the conductors in place; Figs. 2–5 illustrate how a composite conductor can be built, and Fig. 6 shows a modified arrangement of the conductors in the slot.

In Fig. 1 two series of conductors formed of five flat copper bars $s^1$, $s^2$ are illustrated, these being stranded together to form a cable. Fig. 1ª shows how they can be arranged in the slot, $e$ being the iron and $i$ the insulation; the two sets of conductors in this view are distinguished by the different forms of hatchings. In these figures the bars of group I which are indicated by the numerals 1 to 5 are drawn in full lines, while those of group II are drawn in dotted lines. Further those parts of the bars which are situated in the front plane are drawn in thick lines while those which are situated in the back plane are drawn in thin lines.

It will be seen that the component conductors issue from the slot exactly at the point of the cross section at which they entered the same. Fig. 1 shows clearly the stranding together of the two groups of component conductors and also the intertwining of the single conductors. Further it illustrates the great advantages of this manner of building up conductors for since it is sufficient for each component conductor to pass once through each point of the cross section of the slot in order to prevent the generation of eddy currents, therefore to twist the groups of component conductors more than once is unnecessary and also inadvisable because each additional twist requires additional copper and therefore requires a larger cross section of the slot so that the weight and the cost of the machine are increased thereby.

If it were attempted to use a greater number of thinner component conductors such as are employed in other stranded or braided cables, a single twist per slot would not be sufficient because the conductor would not keep together but would fall to pieces. The conductor of the present invention constitutes, however, a perfectly firm body because the component conductors, when they are once properly put together, mutually engage and also the groups of bars are held in position by the elasticity of the material.

To form a conductor as shown in Fig. 1, a number of bars are cranked twice as shown at $a$ in Fig. 2. The crankings are made in straight drawn bars by any suitable means, their length $a$ being uniform while their distance from the end of the bar varies in the various bars.

Fig. 3 is a perspective view of the intertwining of the bars $s^2$ of the group of bars shown in dotted lines in Fig. 1.

Figs. 4$^a$ and 4$^b$ are views in perspective of the two groups $s^1$ and $s^2$ of component conductors. In each of these two figures a bar is marked with hatchings for the purpose of showing better its course in the intertwining of the bars.

Fig. 5 shows the two component conductor groups combined to form the complete conductor. In this view the bars of group $s^2$ (Fig. 4$^b$) are shown with hatchings.

It will be perceived that at both ends of the conductor (or of the slot) the bars of group $s^1$ are situated in front, and those of group $s^2$ at the back, while each group makes a complete turn in the middle of the conductor (or inside the slot). The single bars and groups can be readily soldered at both ends of the conductor outside the slot, without the risk of generating eddy currents.

As shown in Fig. 6 the conductor may lie on edge inside, that is to say it may be turned through 90 degrees relatively to the slot.

The construction shown is given by way of example only and may be modified. For example the number of component conductors may vary, and the number of groups may be other than two. Again the number of twists may be greater than one.

Although the cross sectional shape of the single bars is preferably rectangular it is yet possible to use the round shape when this is desirable on other grounds.

The cranking of the component conductors may be effected at any desired angle.

Obviously more than one conductor of the kind described may be arranged in a single slot.

Having now described my invention, what I claim as new and desire to secure by Letters Patent is:—

1. An electrical conductor comprising a number of metallic strips each with two crankings one toward one edge of the strip and the other away from that edge; the strips forming one half of the conductor being assembled in such a manner that a group is formed wherein the conductor which is at the bottom or side at one end passes by way of the top or other side at one cranking to the bottom or original side at the next cranking; the strips forming the other half of the conductor being similarly assembled; one half being turned through 180 degrees and the two halves then assembled to interlock.

2. An electrical conductor comprising a number of metallic strips of constant width throughout their length and each provided with two crankings, one toward one edge of the strip and the other away from that edge; the strips being disposed at right angles to the crankings and with the crankings evenly displaced in adjacent strips in each half of the conductor, the two halves of the conductor being relatively turned through 180 degrees and assembled.

3. An electrical conductor comprising a metal strip having a portion extending in a straight line, a right angle off-set formed therein, a diagonal bend at said off-set inclining a portion of said strip away from the straight line portion, a second right angle off-set formed in the strip, a second diagonal bend at said off-set and a further straight line portion on the same plane as the first mentioned straight line portion, substantially as described.

4. An electric conductor adapted to be disposed in a rectangular groove comprising a metallic strip having a portion horizontally disposed along the upper surface of the groove, a right angle off-set formed in said strip, a diagonal bend inclining a portion of said strip downwardly to the bottom surface of the groove and a second right angle off-set, a second diagonal bend inclining a portion of said strip upwardly to the upper surface of said groove, and a second portion extending along the upper surface of the groove in the same horizontal plane as the first mentioned portion, substantially as described.

5. An electrical conductor comprising a metallic strip with two crankings, one toward one edge of the strip and the other away from that edge, said conductor adapted to be inserted in a rectangular groove in such position that a portion of the strip which is at the bottom or side at one end passes by way of the top or other side at each cranking to the bottom or original side at the next cranking, substantially as described.

In testimony whereof, I affix my signature in presence of two witnesses.

LUDWIG ROEBEL.

Witnesses:
 WILLY F. HORIK,
 JOSEPH PFEIFFER.